(12) United States Patent
Lachapelle et al.

(10) Patent No.: US 9,702,577 B1
(45) Date of Patent: Jul. 11, 2017

(54) DYNAMIC DETERMINATION OF FAN SPEEDS

(71) Applicant: Amazon Technologies, Inc., Seattle, WA (US)

(72) Inventors: Alan Joseph Lachapelle, Reston, VA (US); Matthew Thomas Phillips, Bainbridge Island, WA (US); Shawn Duane Patrick, Issaquah, WA (US); Michael Steven Greer, Fairfield, PA (US); Taslim A. Abdul Salam, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 14/749,515

(22) Filed: Jun. 24, 2015

(51) Int. Cl.
*B01D 46/44* (2006.01)
*B01D 46/46* (2006.01)
*F24F 11/00* (2006.01)

(52) U.S. Cl.
CPC ........ *F24F 11/0001* (2013.01); *B01D 46/446* (2013.01); *F24F 11/001* (2013.01); *F24F 11/006* (2013.01); *F24F 11/0079* (2013.01); *F24F 2011/0042* (2013.01); *F24F 2011/0063* (2013.01)

(58) Field of Classification Search
CPC .... B01D 46/44; B01D 46/0086; B01D 46/46; B01D 46/002; B01D 46/008; B01D 2273/30
USPC ..... 55/471, 472, 473, DIG. 34; 95/1, 25, 26; 96/417, 397
See application file for complete search history.

(56) References Cited

U.S. PATENT DOCUMENTS

| 5,711,785 | A | * | 1/1998 | Maxwell | B01D 46/002 55/283 |
| 5,772,732 | A | * | 6/1998 | James | B01D 46/46 55/DIG. 34 |
| 5,810,908 | A | * | 9/1998 | Gray | B01D 46/46 55/DIG. 34 |
| 5,914,453 | A | * | 6/1999 | James | B01D 46/0086 340/577 |
| 6,660,070 | B2 | * | 12/2003 | Chung | B01D 46/008 55/385.2 |
| 7,309,365 | B2 | * | 12/2007 | Yuasa | A47L 9/20 15/21.1 |

(Continued)

*Primary Examiner* — Jacob T Minskey
*Assistant Examiner* — Minh-Chau Pham
(74) *Attorney, Agent, or Firm* — Kilpatrick Townsend & Stockton LLP

(57) ABSTRACT

An updated operating speed for a fan of an air handler may be determined. The updated operating speed may depend on a target output volume for the air handler and an intermediate resistance value for a filter of the air handler. The intermediate resistance value may be determined by instructing the fan to operate at a first operating speed for a fixed period of time. During the fixed period of time, a pressure sensing system may sense an observed differential pressure measured across the filter. The observed differential pressure may correspond to the intermediate resistance value. The intermediate resistance value may be used to identify, from a set of filter loading values which may be retained in a filter loading data structure, the updated operating speed for the fan such that the air handler is capable of achieving the target output volume.

20 Claims, 6 Drawing Sheets

(56) References Cited

U.S. PATENT DOCUMENTS

| | | |
|---|---|---|
| 8,623,117 B2 | 1/2014 | Zavodney et al. |
| 8,986,427 B2 * | 3/2015 | Hauville ................ B01D 46/44 55/385.2 |
| 2003/0070544 A1 * | 4/2003 | Mulvaney .......... B01D 46/0086 95/25 |

* cited by examiner

DYNAMIC DETERMINATION OF FAN SPEEDS

BACKGROUND

Air handlers may be used to regulate and circulate air as part of a heating, ventilating, and air-conditioning (HVAC) system. To this end, an air handler may include an inlet, an outlet, and a fan. In some examples, the air handler may also include a filter. The filter may be designed to remove particles (e.g., dust) from air that flows through the air handler. Air flowing through the filter is resisted as it is forced through the filter. The resistance that the filter provides to air flow may depend on the type and design of the filter. The resistance may also depend on the cleanliness of the filter. For example, an old filter may exert a higher resistance compared to a new filter because the old filter will likely have accumulated particles that function to clog the filter and resist air flow.

BRIEF DESCRIPTION OF THE DRAWINGS

Various embodiments in accordance with the present disclosure will be described with reference to the drawings, in which.

DETAILED DESCRIPTION

Figure 1:
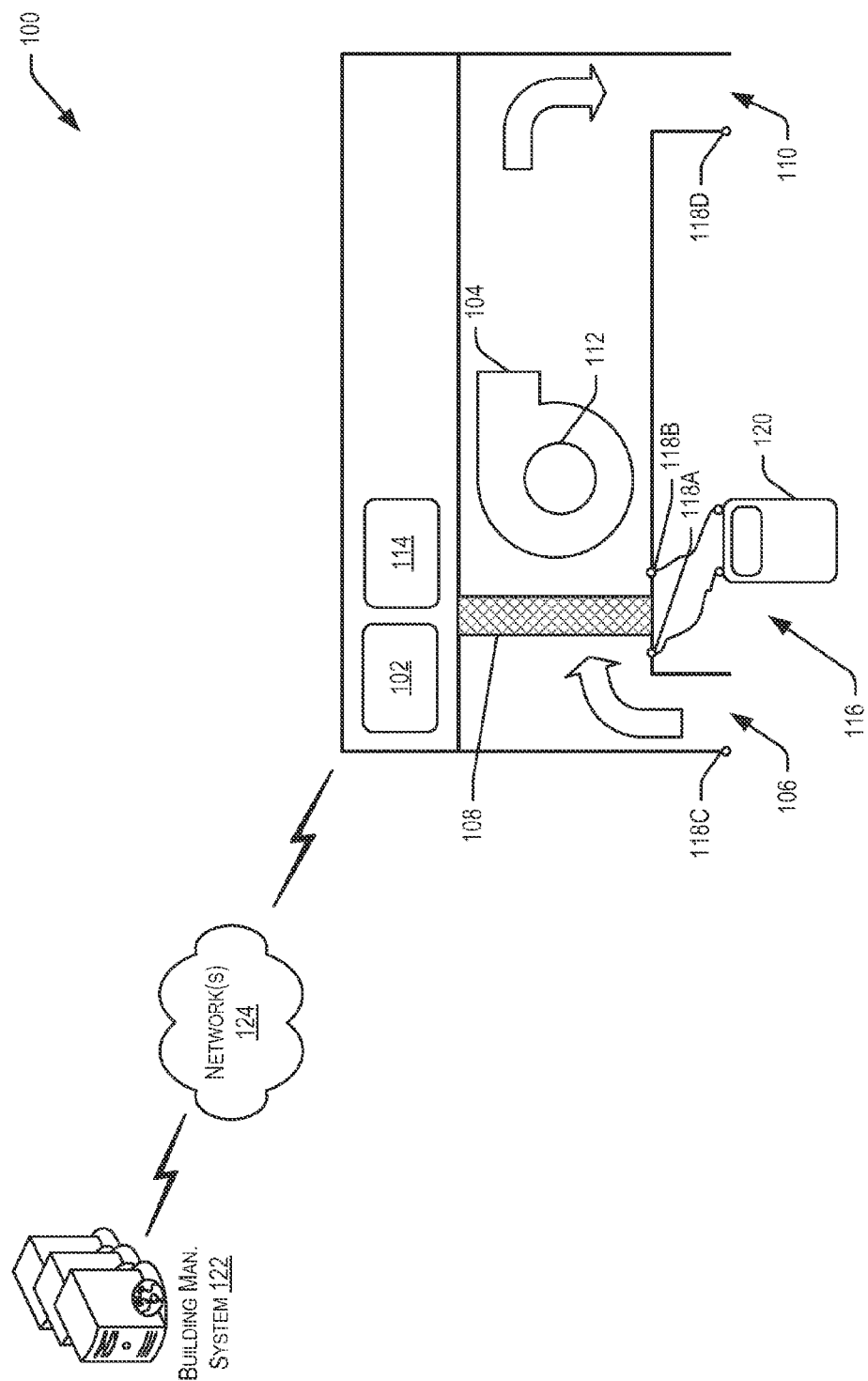
FIG. 1 is an example air handler for implementing techniques relating to dynamic determination of fan speeds as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present description are directed to, among other things, techniques relating to dynamic determination of a desired fan speed for an air handler. In one example, dynamically determining a desired fan speed may include automatically adjusting what constitutes a relative maximum speed of a fan of an air handler over the life of an air filter associated with the air handler. For example, the air handler may be designed to provide a target output volume of air, which may depend, among other things, on the speed of the fan and a resistance value of the filter. Though the fan may be capable of operating at a maximum operating speed (e.g., 70 hertz (hz)), the air handler—and the system in which the air handler is embodied—may be designed such that the fan operates at a lower than maximum speed when the filter is new (e.g., an initial operating speed (e.g., 53 hz)). The initial operating speed may be 100% of a relative maximum operating speed needed to achieve the target output volume when the filter is new. Because the operating speed is directly related to the output volume, defining the relative maximum operating speed in terms of percentage enables a management system to control the output volume of the air handler in terms of percentages along with the operating speed. As the filter ages and gets more dirty, however, running the fan at 100% of the relative maximum operating speed (e.g., 53 hz or the initial operating speed) may no longer achieve the target output volume. This is because particles that the filter has removed from the air have accumulated in the filter, which in turn increases the resistance value of the filter and also reduces the volume of air that can be delivered by the air handler when the fan operates at 100% of the relative maximum operating speed. Thus, an updated operating speed may be dynamically determined such that the fan operates at a suitable speed to overcome the increased resistance of the filter and still achieves the target output volume. Such dynamic determination may include measuring a differential pressure in the air handler that is attributable to a current resistance value of the filter and adjusting the relative maximum operating speed to equal the suitable speed. In this example, such an adjusted relative maximum operating speed may be around 57 hz. Thus, the adjusted relative maximum operating speed will typically be higher than the previous relative maximum operating speed so as to overcome the resistance of the partially clogged filter.

Turning now to a particular example, in this example, an operator may install a filter in an air handler. The filter may be in a clean condition and have an initial pressure drop. An initial operating speed may be set for a fan of the air handler based on a target output volume and the initial pressure drop. The initial pressure drop may be determined by measuring total static pressure (TSP) in the air handler when the filter is in the clean condition or may be received from a manufacturer. The initial operating speed may be noted as a relative maximum operating speed for the fan. A final pressure drop for the filter may be determined, which may be provided by a manufacturer of the filter or determined by the operator. The final pressure drop may be the maximum pressure drop across the filter when the filter is in a dirty condition. In other words, the final pressure drop may be equivalent to the initial pressure drop plus an additional tolerable pressure drop attributable to particle accumulation in the filter. Based on the final pressure drop and the target output volume, a final operating speed may be determined. This is the speed at which the fan should operate to achieve the target output volume when the filter has the final pressure drop. An interpolation technique may be performed to interpolate between these two data points (i.e., initial speed and initial pressure drop, final speed and final pressure drop). This data may be included in a table or a graph accessible by an air handler management device.

The fan may then be instructed to conventionally operate in the air handler. However, after the fan has operated as such for a fixed period of time (e.g., 1 week), the initial operating speed may be rebalanced (i.e., an updated operating speed may be dynamically determined). To do so, the fan may be instructed to run at the initial operating speed (i.e., 100% of the relative maximum operating speed) for a short period of time (e.g., 30 seconds). While the fan is running at this speed, a pressure gauge may be used to identify a differential pressure drop across the filter. This differential pressure drop will likely be greater than the initial pressure drop because the filter will have accumulated debris while it ran during the fixed period of time. Using the table or graph previously determined, an updated operating speed may be determined based on the differential pressure drop. Once determined, the updated operating speed may replace the initial operating speed as the relative maximum operating speed for the fan. The fan may then be instructed to conventionally operate with the updated operating speed as the relative maximum operating speed. During the lifetime of the filter, other updated operating speeds may be dynamically determined any suitable number of times, which may correspond to a fixed interval (e.g., weekly). Such dynamic determination may be considered an optimization of fan speed and filter replacement, which may result in cost savings from reduced power use and replacement of filters on an as-needed basis, instead of an interval basis.

Turning now to the figures, FIG. 1 illustrates an example air handler 100 for implementing techniques relating to dynamic determination of fan speeds as described herein. In particular, the air handler 100 may be any suitable air handler implemented as part of an HVAC system. In some examples, the air handler 100 may be the only air handler in the HVAC system (e.g., in a residential home). In some examples, the air handler 100 may be included among many other air handlers. For example, the air handler 100 may be included in a commercial HVAC system that is designed to provide ventilation for a data center. In this example, the operation of the air handler 100 and other similar air handlers may be in communication with a building management system 122 via one or more networks 124. The one or more networks may include any suitable combination of wired and/or wireless connections capable of carrying electrical signals.

The building management system 122 may be configured to generally manage the operation of the air handler 100 and the other similar air handlers. Thus, the building management system 122 may manage ventilation systems. In some examples, the building management system 122 may not only manage ventilation systems, but may also manage other building systems (e.g., security systems, lighting systems, fire control systems, and other related systems). To this end, the building management system 122 may include a suitable combination of interconnected hardware and software components. For example, the building management system 122 may include a computing device (e.g., a server) in network connection (e.g., via the network 124) with a plurality of management devices associated with each building system (e.g., a ventilation system) or individual elements of each building system (e.g., air handlers). In this manner, the building management system 122 may monitor and control aspects of the building systems. This may include providing instructions to building systems to execute at a system level or providing instructions to elements of the building systems to execute at an element level. In any event, the building management system 122 may be configured to receive feedback, notifications, and the like from the building systems or the elements of the building systems.

With this in mind, the air handler 100 may include an air handler management device 102. The air handler management device 102, as described herein, may be configured to manage the operation of elements of the air handler 100. For example, the air handler management device 102 may communicate with one or more sensors, switches, actuators, motors, and controllers of the air handler 100 in order to control and manage aspects of the operation of the air handler 100, such as flow rate of air, supply air temperature, mixed air temperature, humidity, air quality, and any other aspect of the operation of the air handler 100. In particular, the air handler management device 102 may be in communication with a motor 112 of a fan 104 to manage the operation of the fan 104. This may include turning the fan 104 on and off, increasing and decreasing the speed of the fan 104, setting a relative maximum speed of the fan 104, and any other suitable operation. The air handler 100 may also include other elements which are not shown, but which may also be managed by the air handler management device 102. This may include, for example, heating and cooling elements, sound attenuators, humidifiers, mixing chambers, dampers, heat recovery devices, vibration isolators, and any other element related to the operation of the air handler 100.

In operation and as indicated by the arrows, air enters the air handler 100 at a return duct 106 and travels via a filter 108 and the fan 104 before exiting at a supply duct 110. The filter 108 may include one or more filters that may be placed before and/or after the fan 104, which may be placed within their own filter compartment(s). In some examples, the filter 108 may be any suitable filter that includes any suitable filter medium or combination of filter media configured to remove solid particulates such as dust, pollen, mold, smoke, paint pigments, virus, sea salt, and bacteria from air. Thus, the filter 108 may be constructed of any suitable material (e.g., cotton, paper, textiles, metal screens, non-woven fabrics, granular beds, fiberglass, polyester, foam, and any other suitable material), which may comply with any conventional standard or rating system (e.g., Minimum Efficiency Reporting Value (MERV) rating or High-Efficiency Particulate Arrestance (HEPA) standard).

The rating of the filter 108 may depend on the construction material. A manufacture of the filter 108 may also indicate one or more filter criteria for the filter 108. These filter criteria may be specific to the type of filter and may also correspond to one or more standards. For example, a filter with a MERV rating of 13-16 may be designed to filter particulates ranging from 3.0-1.0 microns in size. The manufacturer may indicate the MERV rating as a criterion for the filter 108. Another filter criterion that may be indicated by the manufacture or otherwise is an initial resistance value of the filter 108. The initial resistance value may correspond to an expected pressure drop across the filter 108 (e.g., 0.35 inch water column (inch WC)). In some examples, a final resistance value corresponding to when the filter 108 should be replaced may also be provided by the manufacturer or determined by an operator of the air handler 100. The final resistance value may indicate the maximum pressure drop tolerable across the filter 108 (e.g., 1.0 inch WC). The increase resistance between the initial and final resistance values may be attributable to the collection of particulates in the filter 108 (i.e., to the filter 108 getting dirty).

In some examples, the fan 104 may be included within its own fan compartment. Whether within its own compartment or not, the fan 104 may be any suitable fan conventionally used in air handlers. To this end, the fan 104 may include the motor 112, which may be an alternating current (AC) induction electric motor capable of operating at a single speed, a variety of set speeds, or be driven by a speed controller 114. In some examples, the speed controller 114 includes a variable frequency drive which may enable the fan 104 to operate at practically any speed between zero and a maximum operating speed of the fan 104. In some examples, the air handler 100 may include more than one fan. In some examples, such fans may be implemented to augment the supply and/or return of air to the fan 104. Thus, these other fans may operate at or near the return duct 106 and the supply duct 110.

The air handler 100 may also include a pressure sensing system 116. As discussed herein, the air handler 100 may include one or more sensors to augment the management and control of the air handler 100. To this end, the pressure sensing system 116 may include pressure sensors 118A-118D. Each of the pressure sensors 118A-118D may be any suitable pressure sensor capable of sensing a pressure. In some examples, the pressure sensors 118A-118D may include electric and/or mechanical components. In some examples, each of the pressure sensors 118A-118D may be configured to measure air pressure at different locations within the air handler 100. For example, the pressure sensors 118A and 118B may be configured to measure air pressure before and after the filter 108. Based on these two sensor readings, a differential pressure (i.e., a difference in pressure) may be determined. In some examples, the differential pressure may indicate that a first pressure sensed by the pressure sensor 118A is greater than a second pressure sensed by the pressure sensor 118B. Such readings may indicate a pressure drop over the filter 108. Similarly, the sensors 118C and 118D may be configured to sense air pressure at the return duct 106 and at the supply duct 110. A similar differential pressure may be determined across the entirety of the air handler 100. This differential pressure may indicate a pressure drop over the filter 108, the fan 104, and any other elements of the air handler between the sensors 118C and 118D. In some examples, this total differential pressure may be considered a total static pressure.

The pressure sensing system 116 may also include a pressure measuring device 120 configured to measure differential pressure such as, for example, a digital manometer, inclines, U-tubes, mechanical manometer (e.g., a Magnehelic® gauge), and any other suitable pressure measuring device. The pressure measuring device 120 may be in communication (e.g., electrical, fluid, network, or in any other suitable manner) with two or more of the pressure sensors 118A-118D in order to measure differential pressures. In some examples, the pressure measuring device 120 may be configured to provide pressure sensing information (e.g., pressures, differential pressures, and other pressure-related information) to the air handler management device 102. In some examples, the pressure sensors 118A-118D may be in direct communication with the air handler management device 102. In this manner, the air handler management device 102 may include functionality similar to the pressure measuring device 120 in order to determine a differential pressure from pressure readings sensed by the pressure sensors 118A-118D.

Figure 2:
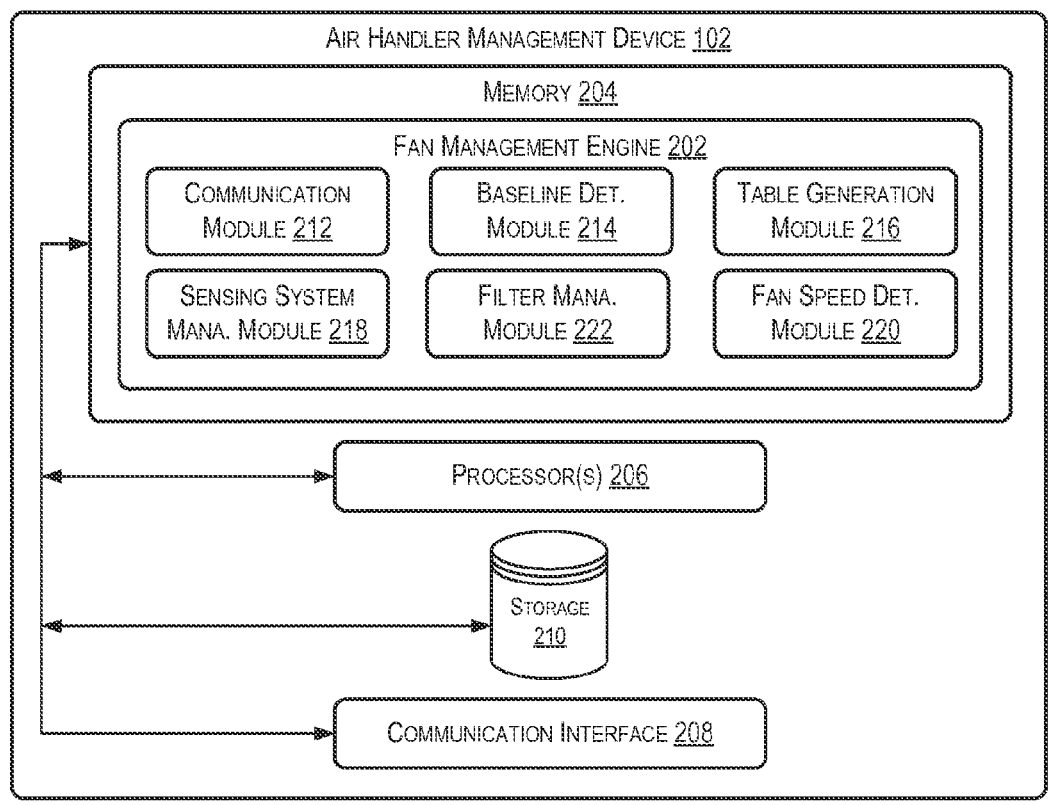
FIG. 2 is an example device for implementing techniques relating to dynamic determination of fan speeds as described herein, according to at least one example.

In FIG. 2 is illustrated additional details of the air handler management device 102 introduced in FIG. 1. The air handler management device 102 may be any suitable computing device, including software and/or hardware, capable of communicating with, and managing the operation of, elements of the air handler 100, including the fan 104. To this end, the air handler management device 102 may include a fan management engine 202 within memory 204. Within the memory 204 of the air handler management device 102 may also be stored other program instructions that are loadable and executable on processor(s) 206, as well as data generated during the execution of these other programs and the fan management engine 202. Depending on the configuration and type of the air handler management device 102, the memory 204 may include more than one memory and may be distributed throughout the air handler management device 102 and/or the building management system 122. Depending on the configuration and type of memory including the fan management engine 202, the memory 204 may be volatile (such as random access memory (RAM)) and/or non-volatile (such as read-only memory (ROM), flash memory, or other memory). The memory 204 may include one or more application programs, modules, engines, or services for implementing the features disclosed herein including at least the fan management engine 202. In some examples, the memory 204 may include a web service application to enable the fan management engine 202 to enable a user to access web-based resources provided, for example, by the building management system 122.

The air handler management device 102 may also include additional storage, both removable and non-removable. The additional storage is an example of computer-readable storage media. For example, computer-readable storage media may include volatile or non-volatile, removable or non-removable media implemented in any suitable method or technology for storage of information such as computer-readable instructions, data structures, program modules, or other data. As used herein, modules, engines, and components may refer to programming modules executed by computing systems (e.g., processors) that are part of the air handler management device 102 and/or the building management system 122.

The air handler management device 102 may also include a communication interface 208. The communication interface 208 may function as any suitable interface for getting information into the air handler management device 102 and out of the air handler management device 102. For example, via the communication interface 208, the fan management engine 202 may receive and/or access input information such as sensing information sensed by the pressure sensing system 116, initial criteria corresponding to the filter 108, pre-determined input values (e.g., target output volume, initial speed value, and any other suitable input value). Similarly, via the communication interface 208, the fan management engine 202 may provide output in the form of instructions to the fan 104, notifications to the building management system 122, notifications to operators, and any other suitable output. In some examples, the communication interface 208 may function like a user interface and be utilized by an operator or other authorized user to access portions of the air handler management device 102. In some examples, the communication interface 208 may include a graphical user interface, web-based applications, programmatic interfaces such as application programming interfaces (APIs), or other user interface configurations. The air handler management device 102 may also include a data store 210. In some examples, the data store 210 may include one or more data stores, databases, data structures, or the like for storing and/or retaining information associated with implementing techniques described herein.

For example, within the data store 210 may be retained data that is used by the air handler management device 102 to dynamically determine the operating speeds of the fan 104 to respond to the increasing resistance values of the filter 108 over the life of the filter 108. In some examples, within the data store 210 may be retained data that is generated during and after the operating speeds of the fan 104 are determined.

Within the data store 210 may also be retained criteria and/or specifications related to the elements of the air handler 100. For example, the data store 210 may include filter criteria corresponding to one or more filters currently or previously in use by the air handler 100. The filter criteria may include predetermined criteria and/or generated criteria, for example, filter style, filter size and frame depth designators, frame dimensions, rated capacity (e.g., in cubic feet per minute (CFM)), maximum initial resistance (e.g., in inch WC), maximum final resistance (e.g., in inch WC), MERV rating, replacement schedule, and any other suitable filter criteria. The data store 210 may also include fan criteria corresponding to fans currently or previously in use by the air handler 100. The fan criteria may include predetermined criteria and/or criteria that are automatically generated during use and/or pre-generated criteria, for example, maximum and minimum operating speeds, relative maximum operating speeds, fan curve data, filter loading data, efficiency, maximum rated output volume, and any other suitable fan criteria.

The fan management engine 202 may be configured to manage one or more sub-modules, components, engines, and/or services directed to examples disclosed herein. In some examples, the fan management engine 202 may include a communication module 212, a baseline determination module 214, a table generation module 216, a sensing system management module 218, a fan speed determination module 220, and a filter management module 222. While these modules are illustrated in FIG. 2 and will be described as performing discrete tasks with reference to the flow charts, it is understood that FIG. 2 illustrates example configurations and other configurations performing other tasks and/or similar tasks as those described herein may be implemented according to the techniques described herein. Other modules, components, engines, or services may perform the same tasks as the fan management engine 202 or other tasks, they each may be implemented in a similar or different fashion.

The communication module 212 may be configured to enable communication with the building management system 122, other air handler management devices, and elements of the air handler 100, and to enable communication between other modules of the fan management engine 202. For example, the communication module 212 may process communications provided and received via the communication interface 208.

The baseline determination module 214 may be configured to establish a baseline for the air handler 100, which may include an initial speed value for the fan 104, an initial resistance value for the filter 108, and a target output volume for the air handler 100. The target output volume may be the volume of air that the air handler 100 is designed to output within its particular implementation (e.g., a residential home, a commercial shopping center, a data center, and any other suitable implementation). In some examples, the target output volume may be less than or equal to the rated output volume for the air handler 100, which may be the total volume of air that the air handler 100 is capable of outputting. In some examples, the initial speed is selected such that the air handler 100 is capable of achieving the target output volume with an initial resistance value of the filter 108. The initial resistance value may correspond to the filter 108 being in a clean condition (i.e., a condition in which the filter 108 has accumulated very little or no particulates or has a resistance value at or about the manufacture's initial resistance value).

In some examples, the baseline determination module 214 may be used to receive certain initial values, as discussed above. From these, the baseline determination module 214 may be configured to determine one or more final values. Such final values may include, for example, a final speed value and a final resistance value. In some examples, the final speed value is selected such that the air handler 100 is capable of achieving the target output volume with the final resistance value of the filter 108. This may include using a fan curve corresponding to the fan 104 to identify the final speed value. In some examples, this may include using the fan affinity law to identify the final speed value. In some examples, the final speed value may be determined observationally. For example, a filter that is ready for replacement, i.e., that has a final resistance value, may be installed into the air handler 100. A volume measuring device, which may be included as part of the pressure sensing system 116, may be used to measure the volume of air being delivered by the air handler 100 as the speed of the fan 104 is increased. When the volume measuring device indicates that the air handler 100 is producing the target output volume of air, the operating speed of the fan 104 may be logged. This operating speed may correspond to the final speed value for implementing techniques described herein. The final resistance value may correspond to the filter 108 being in a dirty condition (i.e., a condition in which the filter 108 has accumulated particulates, reached the end of its useable life, or has a resistance value at or about the manufacture's recommended replacement resistance value).

The table generation module 216 may be configured to generate filter loading values, which may be included in one or more data structures, including tables and graphs for implementing the techniques described herein. For example, such data structures may be filter loading tables that may be used by the fan management engine 202 to determine an updated speed for the fan 104 based on an intermediate filter resistance value. In some examples, the table generation module 216 may access, which may include receive and/or request, two or more baseline data points (e.g., resistance value, fan speed), and interpolate between the two or more baseline data points. In some examples, this may include interpolating linearly, interpolating logarithmically, or interpolating in any other suitable manner to identify new data points falling between the two or more discrete sets of known data points. In some examples, the known data points may be two dimensional.

The sensing system management module 218 may be configured to manage the pressure sensing system 116. For example, the sensing system management module 218 may receive sensing information from the pressure sensing system 116 and perform one or more operations on the information (e.g., conversion, subtraction, and the like) prior to other modules of the fan management engine 202 using the sensing information.

The fan speed determination module 220 may be configured to determine an updated fan speed based on the filter loading values within a filter loading table and an observed differential pressure reading sensed by the pressure sensing system 116. Thus, the fan speed determination module 220 may be configured to determine an updated speed of the fan 104 in accordance with other information generated or accessed by the fan management engine 202.

The filter management module 222 may be configured to identify or determine characteristics of a filter that is being used. For example, this may include identifying a percentage of life of the filter used or a percentage of life left. In some examples, the filter management module 222 may determine when to replace the filter. In some examples, the function of the air handler management device 102 may be implemented by the building management system 122.

Figure 3:
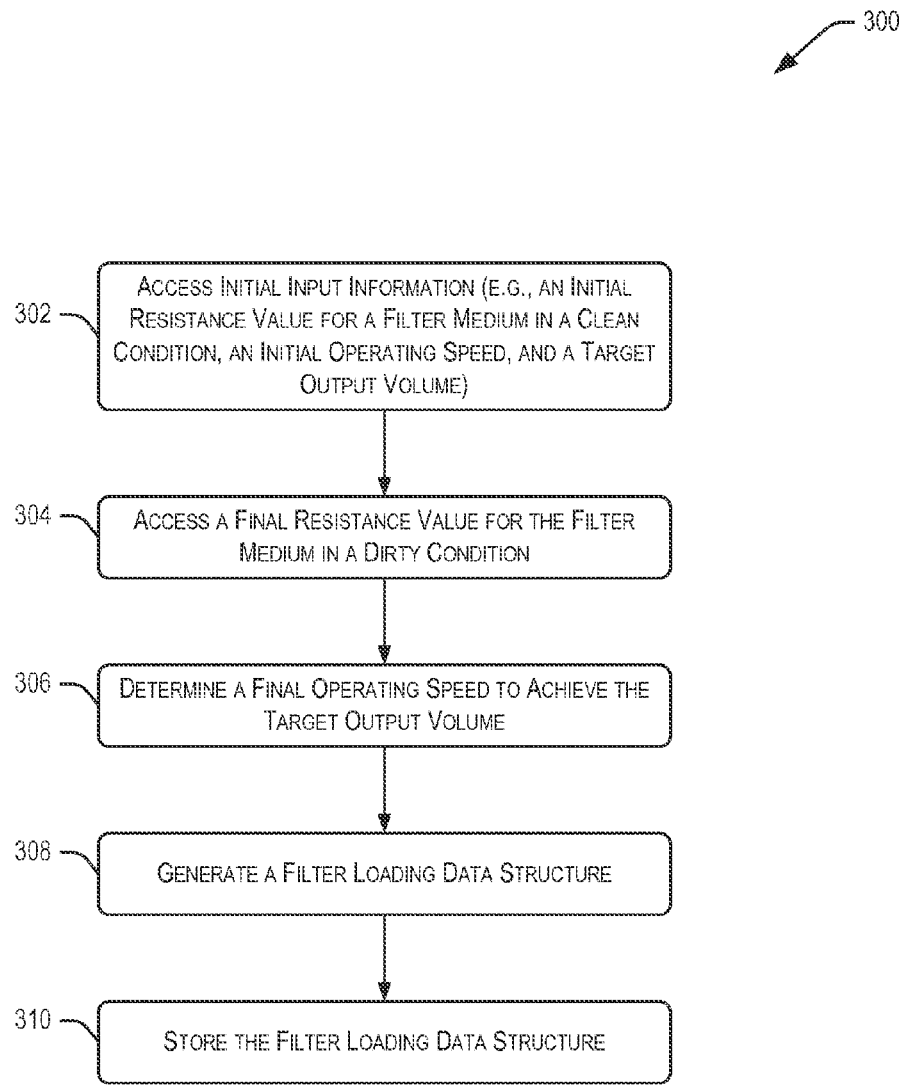
FIG. 3 is a flow diagram depicting example acts for implementing techniques relating to dynamic determination of fan speeds as described herein, according to at least one example.
Figure 5:
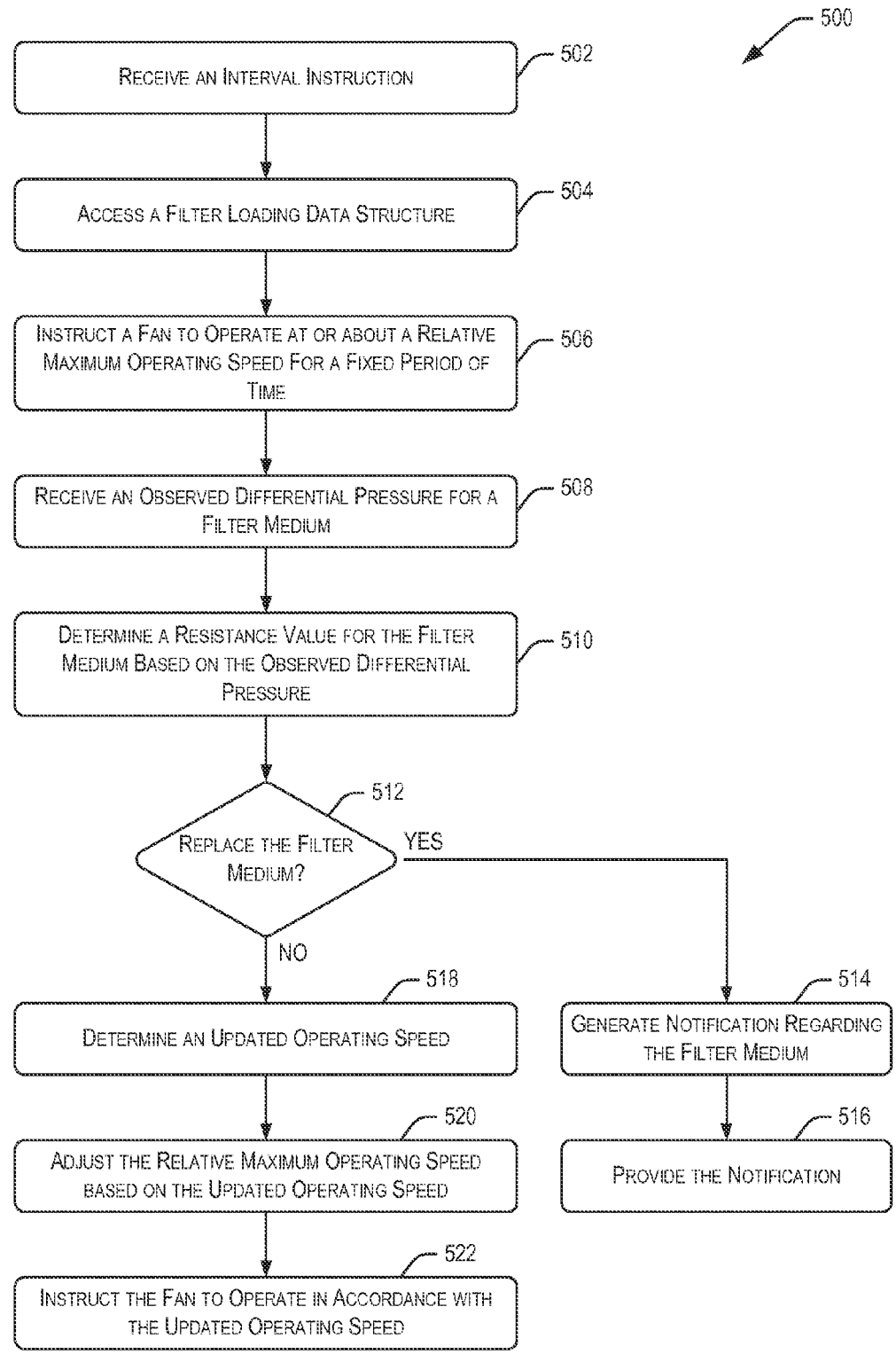
FIG. 5 is a flow diagram depicting example acts for implementing techniques relating to dynamic determination of fan speeds as described herein, according to at least one example.

FIGS. 3 and 5 illustrate example flow diagrams showing respective processes 300 and 500, as described herein. These processes 300 and 500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 3 depicts the process 300 including example acts or techniques relating to dynamic determination of fan speed values in accordance with at least one example. The fan management engine 202 (FIG. 2) of the air handler management device 102 (FIG. 1) may perform the process 300 of FIG. 3. The process 300 begins at 302 by accessing initial input information. In some examples, accessing the initial input information may be performed by the baseline determination module 214 (FIG. 2). The initial input information may include, for example, an initial resistance value for a filter medium in a clean condition, an initial operating speed for a fan, and a target output volume for an air handler. Accessing the initial input information may include receiving all or some of the initial input information as an operator inputs the information at a user interface in communication with the air handler management device 102. In some examples, accessing the initial input information may include requesting the information from the data store 210. In some examples, the initial input information may be included within a table or other data structure associated with the air handler 100.

At 304, the process 300 accesses a final resistance value for the filter medium in a dirty condition. In some examples, accessing the final resistance value may be performed by the baseline determination module 214. In some examples, the filter medium is considered to be in a dirty condition when the filter medium has reached or exceeded its useable life. In some examples, the filter medium is dirty because it has accumulated particles and/or is clogged or partially clogged. In some examples, the resistance value for the filter medium increases as particles are captured in the filter medium. Accessing the final resistance value may include receiving the final resistance value as an input from an operator via a user interface in communication with the air handler management device 102. In some examples, accessing the final resistance value may include requesting the final resistance value from the data store 210. In some examples, the final resistance value may be included within a table or other data structure associated with the air handler 100.

At 306, the process 300 determines a final operating speed to achieve the target output volume. In some examples, determining the final operating speed may be performed by the baseline determination module 214. Determining the final operating speed may include solving for the final operating speed empirically based at least in part on the initial operating speed, the initial resistance value, and the final resistance value. This may include using the fan affinity law to calculate the final operating speed. In some examples, solving for the final operating speed may include accessing a fan curve for the fan (or data that is represented by the fan curve) to determine the impact on the system when the resistance value of the filter is increased. The final operating speed may be the operating speed at which the target output volume is achieved when the filter medium is in the dirty condition and has the final resistance value.

At 308, the process 300 generates a filter loading data structure. In some examples, generating the filter loading data structure may be performed by the table generation module 216 (FIG. 2). Generating the filter loading data structure may include calculating a plurality of data points that are bounded by a minimum data point and a maximum data point in two dimensions. For example, the minimum data point may correspond to the initial operating speed and initial resistance value, and the maximum data point may correspond to the final operating speed and the final resistance value. In some examples, the plurality of data points comprise filter loading values and may be determined linearly or logarithmically. Once the plurality of data points are calculated, they may be populated within the filter loading data structure. For example, the data points may be populated within a filter loading table or a filter loading graph. In any event, the filter loading data structure may be used to approximate a first value (e.g., an updated operating speed or an intermediate resistance value) based on a second corresponding value (e.g., the intermediate resistance value or the updated operating speed).

At 310, the process 300 stores the filter loading data structure. In some examples, storing the filter loading data structure may be performed by the table generation module 216. Storing the filter loading data structure may include storing the data structure in local memory of the air handler management device. In some examples, storing the data structure may include storing at a remote location that is accessible to the air handler management device. For example, in a ventilation system that includes a plurality of similar air handlers including the same fans and the same filters, the filter loading data structure may be shared by the plurality of air handler management devices associated with the plurality of air handlers. In this manner, the filter loading data structure may only be calculated once for all similar air handlers.

Figure 4:
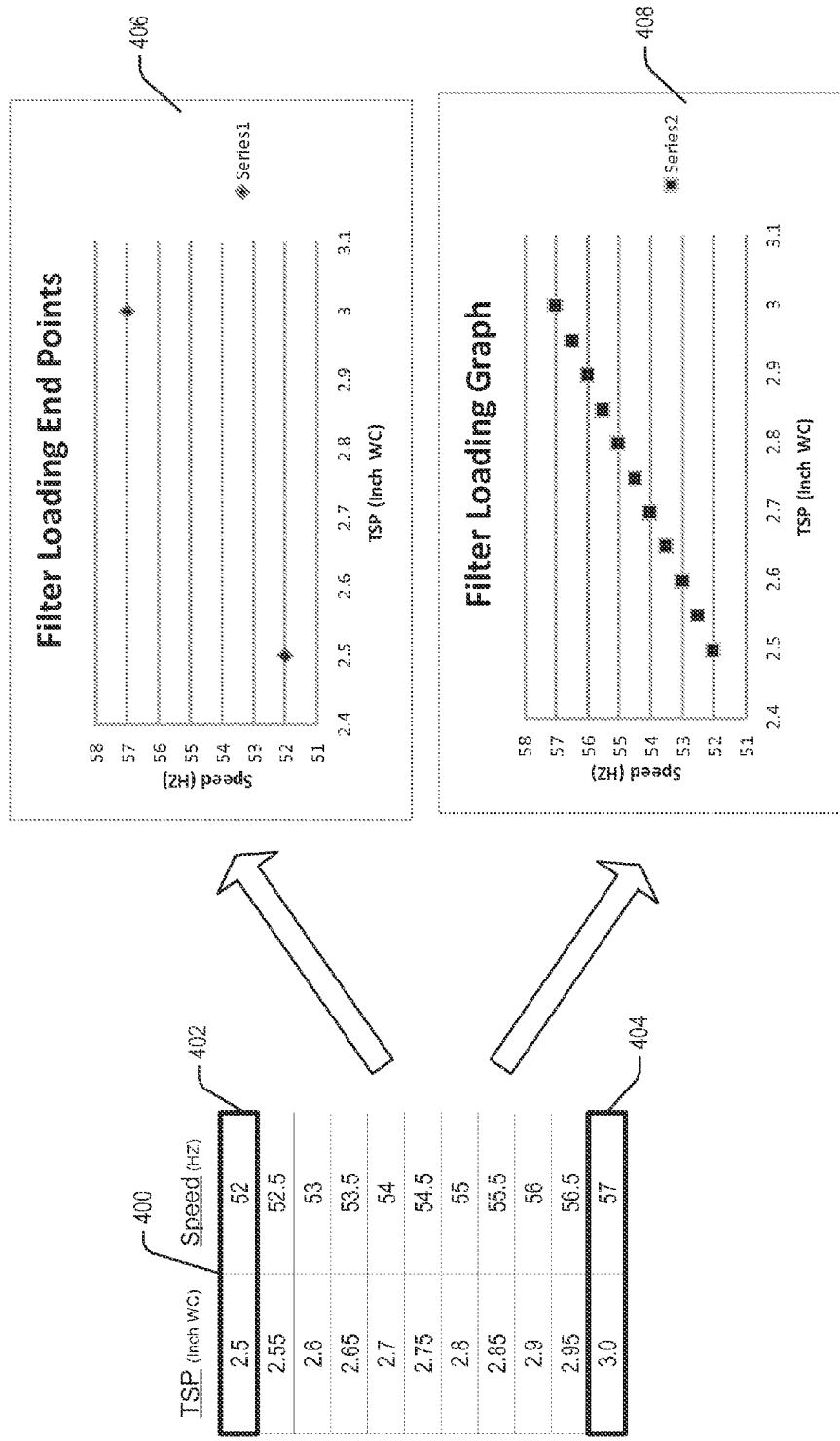
FIG. 4 is an example diagram including data structures for use in implementing techniques relating to dynamic determination of fan speeds as described herein, according to at least one example.

In FIG. 4 is illustrated example filter loading data structures at various stages of detail. Filter loading table 400 is an example of a filter loading data structure after a plurality of data points (e.g., filter loading values) have been calculated and populated within the filter loading table 400. In some examples, the values in rows 402 and 404 may indicate initial values and final values. In this example, the first column of the filter loading table 400 may include total static pressure (TSP) values for an air handler. The TSP values may correspond directly to filter resistance values of a filter medium that is being used in the air handler. Thus, in some examples, instead of including the TSP values for the air handler, the filter loading table 400 may include filter resistance values of the filter medium (e.g., pressure drop values attributable to the filter medium as part of the TSP). The TSP values may also correspond directly to speed values which are also shown in the filter loading table 400. In some examples, a pressure drop over a filter medium with an initial resistance value may be accounted for by an initial TSP value. That is, the TSP value may be the sum of the external static pressure (ESP) (i.e., static pressure in the supply and return duct work that the fan has to work against) and the uniform static pressure (USP) (i.e., the pressure drop across filters, coils, and twists and turns inside the air handler). Thus, as the filer medium becomes dirtier, its resistance value increases, which in turn increases the USP value and the TSP value.

In some examples, an initial TSP value of 2.5 inch water column (inch WC) and an initial operating speed value of 52 hz may be included in the row 402 of the filter loading table 400. In some examples, instead of the initial TSP value of 2.5 inch WC, an initial filter resistance value of 0.35 inch WC may be included in the row 402. In some examples, a final TSP value of 3.0 inch WC and a final operating speed value of 57 hz may be included in the row 404 of the filter loading table 400. In some examples, instead of the final TSP value of 3.0 inch WC, a final filter resistance value of 0.85 inch WC may be included in row 404. The initial and final values may be determined in accordance with techniques described herein (e.g., see the process 300).

The values in the rows 402 and 404 may be graphed. For example, graph 406 illustrates a graphical depiction of the values in the rows 402 and 404 after they have been graphed. In some examples, these values may be considered endpoints, which are used as boundaries of the interpolation between the values in the rows 402 and 404. The intermediate values in the filter loading table 400 (i.e., TSP values of 2.55 to 2.95 and speed values of 52.5 to 56.5) have been calculated using a linear interpolation technique between the values in the rows 402 and 404. In some examples, the intermediate values may be determined with a finer or greater level of granularity. In some examples, other intermediate values may be calculated using other techniques to arrive at different or similar results. For example, the interpolation between the endpoints (i.e., the values in the rows 402 and 404) may be logarithmic.

In any event, the results of the interpolation (e.g., the intermediate values) may be graphed as illustrated in graph 408. In some examples, the graph 408 may include the endpoints and the intermediate values. In this manner, the graph 408 may be used to determine an updated speed when an intermediate TSP value is determined that falls within the endpoints. In some examples, the graph 408 may be used to approximate an intermediate TSP value when an operating speed is adjusted to a value that falls within the endpoints.

FIG. 5 depicts the process 500 including example acts or techniques relating to dynamic determination of fan speeds in accordance with at least one example. The fan management engine 202 (FIG. 2) of the air handler management device 102 (FIG. 2) may perform the process 500 of FIG. 5. In some examples, the process 500 may be a continuation of the process 300. In some examples, the process 500 may be a stand-alone process. In some examples, determining updated fan speeds may be considered rebalancing of the air handler. In some examples, one or more of the acts of the process 500 may constitute a rebalancing process.

The process 500 begins at 502 by receiving an interval instruction. In some examples, receiving the interval instruction may be performed by the communication module 212 (FIG. 2). Receiving the interval instruction may include receiving the interval instruction from an operator via input at a user interface. The interval instruction may indicate an interval according to which the determination of fan speeds may be performed. For example, the interval may indicate that updated fan speeds be determined daily, weekly, monthly, or according to any other suitable division of time. In some examples, the interval instruction may include instructions that updated fan speeds be determined after a certain number of hours that the fan or the filter has been in operation.

At 504, the process 500 accesses a filter loading data structure. In some examples, accessing the filter loading data structure may be performed by the fan speed determination module 220 (FIG. 2). Accessing the filter loading data structure may include retrieving speed data and pressure data from the filter loading data structure. The speed data may correspond to operating speeds of a fan, and the pressure data may correspond to resistance values of a filter medium and/or TSP values for an air handler. Some or all of the changes of the TSP values may be attributable to the increases in the resistance values. In some examples, accessing the filter loading data structure may include receiving the speed data and the pressure data from another element of the air handler or other component of the building management system.

At 506, the process 500 instructs a fan to operate at or about a relative maximum operating speed for a fixed period of time. In some examples, instructing the fan to operate may be performed by the fan speed determination module 220. Instructing the fan to operate may include providing an instruction in the form of an electrical signal to a motor of the fan and/or to a speed controller including a variable frequency drive associated with the motor to set the fan's speed to the relative maximum operating speed. In some examples, the relative maximum operating speed may have been determined as 100% of an initial operating speed determined using techniques described herein. In some examples, the fixed period of time may be any suitable period of time. For example, the fixed period of time may be around 30 seconds, but may be more or less. In any event, having the fan run for the fixed period of time may enable any air turbulence that could affect pressure readings to settle out. In addition, having the fan run for a fixed period of time may enable a pressure sensing system to take one or more pressure readings that may be used to determine an average differential pressure. In some examples, having the fan operate at or about the relative maximum operating speed may enable the building management system to implement usage-based filter replacement.

At 508, the process 500 receives an observed differential pressure for a filter medium. In some examples, receiving the observed differential pressure may be performed by the sensing system management module 218 (FIG. 2). Receiving the observed differential pressure may include receiving one or more pressure readings from a pressure sensing system. In some examples, the observed differential pressure may include a TSP reading for the air handler based on the filter medium. In some examples, the observed differential pressure is measured by the pressure sensing system while the fan operates at or about the relative maximum operating speed. In some examples, the observed differential pressure may be an average differential pressure determined from two or more pressure readings. In some examples, receiving the observed differential pressure may include receiving one or more pressure readings and determining the observed differential pressure based on the one or more pressure readings. In some examples, the observed differential pressure may correspond to an intermediate resistance value of the filter medium in a transitional condition. The resistance value of the filter medium may be intermediate because it falls between an initial or new resistance value and a final or replacement resistance value. The condition of the filter medium may be transitional because the filter medium has been in use for some time and has therefore transitioned from the clean condition toward the dirty condition.

At 510, the process 500 determines a resistance value for the filter medium based at least in part on the observed differential pressure. In some examples, determining the resistance value may be performed by the sensing system management module 218. Determining the resistance value for the filter medium may include determining the resistance value from a TSP value corresponding to the observed differential pressure. For example, because the filter medium may be one of the primary elements within the air handler that causes changes in TSP once the air handler is operating, by measuring the TSP in the air handler, the difference can likely be attributed to the filter medium. In some examples, the resistance value for the filter medium is the same value as the observed differential pressure.

At 512, a determination is made whether to replace the filter medium. In some examples, determining whether to replace the filter medium may be performed by the filter management module 222. This determination may depend at least in part on the resistance value determined at 510. For example, if the determined resistance value for the filter medium approaches, meets, or exceeds the final resistance value, the answer at 512 may be YES. This may mean that the filter medium is so clogged with particles (e.g., dirty) that it is impeding air flow beyond a designed or manufacture-recommended amount. In some examples, this may enable replacement of filter media to move from an interval model with replacements every month, every quarter, or according to any other interval to a usage-based model. In some examples, a usage-based filter replacement model may also enable an operator to optimize the replacement of filters over the speeds and power consumption of fans. For example, when a filter is dirty, more speed (and therefore more power) is required to meet a target output volume. It may be that the cost of more frequent filter replacement may be less than the additional power consumption needed to overcome filter resistance when the filters are dirtier. In some examples, the resistance value for the filter medium may be said to approach the final resistance value when the resistance value is some percentage (e.g., 80%-95%) of the final resistance value. In some examples, the resistance value for the filter medium can be said to approach the final resistance value when the resistance value is within some percentage (e.g., 20%-5%) of the final resistance value.

In some examples, determining whether to replace a filter may include estimating the life of the filter in terms of maximum-speed hours of life left. For example, for a particular filter and air handler, it may be observed how long, in terms of hours, a fan of the air handler may be operated at its maximum operating speed until a final resistance value of the filter is achieved. In some examples, this process may be repeated for the particular filter and the air handler to calculate an average length of time. This average length of time—or the value from a single observation—may be considered an effective maximum-speed operating life value (e.g., 10,500 effective maximum-speed hours). This is the length of time that the fan can be operated as its maximum speed before the filter should be replaced. This value may correspond to the target output volume for the air handler. Thus, a comparable filter may have a comparable effective maximum-speed operating life value. Using techniques described herein, the comparable filter may be installed at t=0. At the same time, the fan may begin to operate with a first maximum relative operating speed, which is a proportion of the final operating speed determined herein. At t=1, because the proportion is known, it may be determined how much of the effective maximum-speed operating life value has been used during the period from t=0 to t=1. In accordance with techniques described herein, a second maximum relative operating speed may then be determined. The remaining life of the filter may be estimated by comparing the number of effective maximum speed hours remaining for the filter as the fan operates at the second maximum relative operating speed, which is a percentage of the final operating speed. The remaining life may be predicted at each interval when the maximum relative operating speed is rebalanced. If the operation schedule for the fan is known (e.g., operate 24 hours a day, 7 days a week), an estimated replacement date for the filter may be determined. For example, if 2,000 effective maximum-speed hours remain and the fan is set to operate at a maximum relative operating speed that is 90% of the final operating speed, the filter may have 2,222 actual hours (i.e., about 93 days) of life left when operating at the 90% speed. This value may also fluctuate if the actual speed of the fan (and therefore the actual output volume) is measured and considered. For example, the fan may operate at a percentage of the maximum relative operating speed, which may be converted to a percentage of the final operating speed and used to determine the number of actual hours of life remaining if the fan operates at the slower speed. Any of this information regarding the life of the filter may be provided to the building management system to determine when to order new filters, to arrange replacement schedules, or to perform any other suitable function regarding replacement of filters.

If the answer at 512 is YES, the process 500 continues to 514, where the process 500 generates a notification regarding the filter medium. The notification may include certain information about the filter medium that was generated and/or observed at 502-512. For example, the notification may include a percentage of useable life that the filter medium has left (e.g., 50%). This may be based on the initial resistance value, the final resistance value, the observed differential pressure, and the average or forecasted average operating speed. This information may be used to generate a replacement schedule, which may be included in the notification. In addition to the replacement schedule, information about the filter medium may be used to identify problematic air handlers or problematic areas within a ventilation system in a building. For example, if filters for two similar air handlers running next to each other are needing replacement at different intervals, it may be that one of the air handlers is overworked (e.g., running at a higher relative operating speed than the other air handler). In some examples, the return air for each air handler may have different particles in it that cause one filter to clog quicker than the other.

At 516, the process 500 provides the notification. In some examples, providing the notification may be performed by the communication module 212. Providing the notification may include providing the notification to the building management system. In some examples, the building management system may then determine a schedule for replacing the filter and/or schedule an operator to replace the filter. In some examples, the building management system may receive a plurality of notifications from a plurality of air handlers and use the plurality of notifications to optimize the replacement of filters and operation of the air handlers.

If the answer at 512 is NO, the process 500 continues to 518 where an updated operating speed is determined. In some examples, determining the updated operating speed may be performed by the fan speed determination module 220. Determining the updated operating speed may include determining the updated operating speed based at least in part on the observed differential pressure and/or intermediate resistance value and the target output volume. The updated operating speed may be selected such that the air handler is capable of achieving the target output volume with the filter having the intermediate resistance value.

At 520, the process 500 adjusts the relative maximum operating speed based on the updated operating speed. In some examples, adjusting the relative maximum operating speed may be performed by the fan speed determination module 220. Adjusting the relative maximum operating speed may include adjusting a setting of a speed controller associated with the fan such that the updated operating speed is equal to the updated relative maximum operating speed. In some examples, the updated relative maximum operating speed may be less than or equal to a maximum rated speed of the fan.

At 522, the process 500 instructs the fan to operate in accordance with the updated operating speed. In some examples, instructing the fan to operate in accordance with the updated operating speed may be performed by the fan speed determination module 220. Instructing the fan to operate in accordance with the updated operating speed may include instructing the fan to operate as a percentage of the updated operating speed. For example, because at 520 the relative maximum operating speed for the fan was set as the updated operating speed, the fan may now operate as a percentage of the updated operating speed. When the fan operates at the updated operating speed, the air handler may be capable of achieving the target output volume. However, because the target output volume is not provided by the air handler at all times, the fan may be configured to operate at a percentage of the updated operating speed in order to provide a percentage of the target output volume. In some examples, aspects of the process 500 may be repeated according to the interval instruction over the life of the filter. In this manner, an updated speed may be determined periodically to account for the progressive increase in resistance that the filter develops as it gets dirtier over its life.

Figure 6:
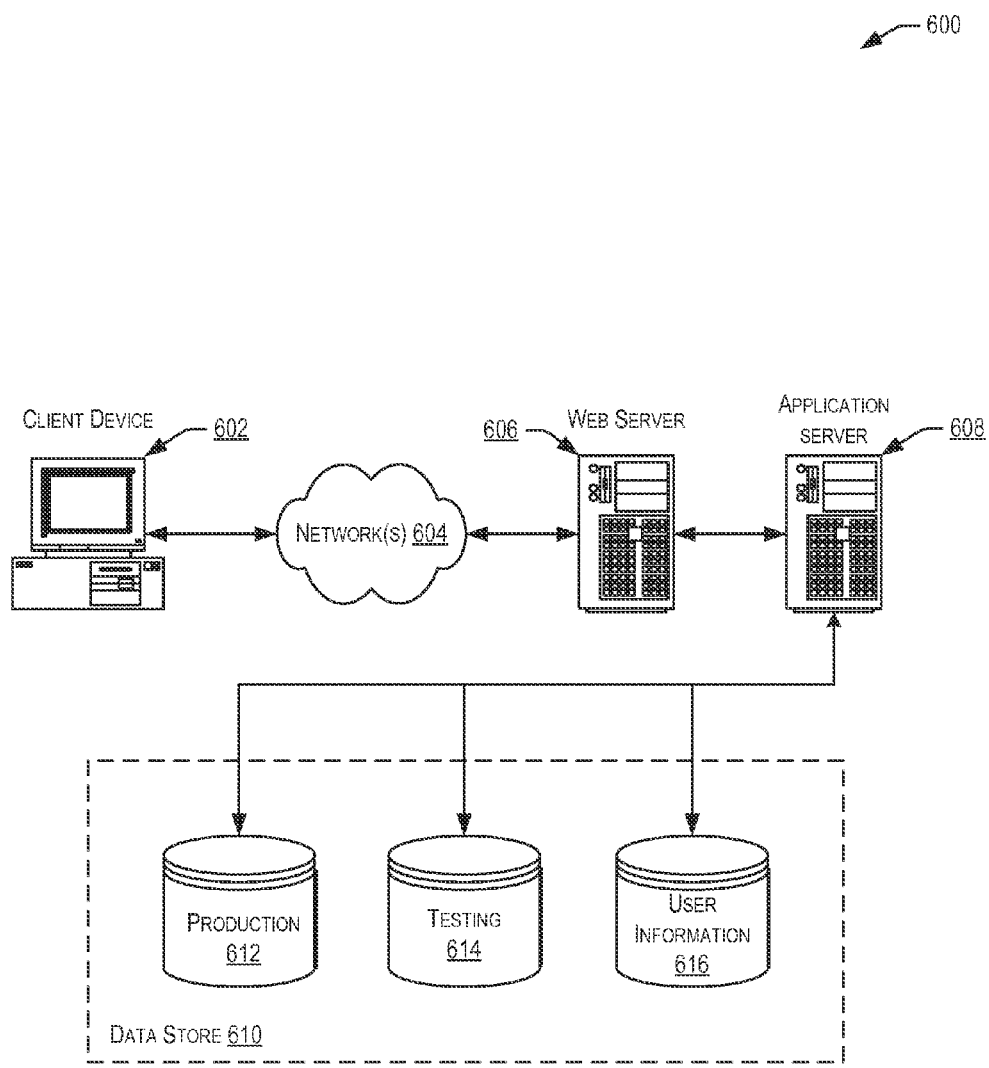
FIG. 6 is an example schematic environment for implementing techniques relating to dynamic determination of fan speeds as described herein, according to at least one example.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A system comprising:
an air handler comprising:
  a fan disposed within the air handler;
  a filter medium configured to at least filter air that flows into the fan or out of the fan; and
  a pressure sensing system configured to at least measure differential pressure across the filter medium; and
a management device in communication with the fan, the management device configured with at least a memory and a processor configured to:
  access a target output volume for the air handler, an initial resistance value of the filter medium in a clean condition representing a differential pressure across the filter medium when in the clean condition, and an initial operating speed for the fan such that the air handler achieves the target output volume as air flows through the filter medium in the clean condition;
  access a final resistance value of the filter medium in a dirty condition, the dirty condition representing a clogged condition of the filter medium when particles are captured in the filter medium causing the final resistance value to represent a differential pressure across the filter medium that is higher than the initial resistance value;
  determine a final operating speed for the fan where the air handler achieves the target output volume as air flows through the filter medium at the final resistance value;
  generate a filter loading table that compares:
    one or more resistance values of the filter medium having values bounded by the initial resistance value and the final resistance value; and
    one or more operating speeds of the fan, the one or more operating speeds representing, for each resistance value, an operating speed of the fan at that resistance value for achieving the target output volume, the one or more operating speeds having values bounded by the initial operating speed and the final operating speed, wherein the filter loading table is usable to determine operating speeds of the fan given resistance values of the filter medium and the target output volume;
  instruct the fan to operate at or about a relative maximum operating speed set at the initial operating speed for a fixed period of time;
  receive, at the end of the fixed period of time, from the pressure sensing system, an observed differential pressure corresponding to an intermediate resistance value of the filter medium in a transitional condition;
  determine, based on the observed differential pressure and the filter loading table, an updated operating speed for the fan to achieve the target output volume; and
  instruct the fan to operate in accordance with a new relative maximum operating speed set at the updated operating speed.

2. The system of claim 1, wherein the management device is further configured to:
after instructing the air handler to operate at the new relative maximum operating speed, instruct the fan to operate at or about the new relative maximum operating speed for a second fixed period of time;
at the end of the second fixed period of time, receive, from the pressure sensing system, a second observed differential pressure corresponding to a second intermediate resistance value of the filter medium in a second transitional condition;

determine, based on the second observed differential pressure and the filter loading table, a second updated operating speed for the fan to achieve the target output volume; and instruct the fan to operate at a second new relative maximum operating speed set at the second updated operating speed.

3. The system of claim 1, wherein the filter loading table is based on a linear or a logarithmic interpolation between:
the initial resistance value and the initial operating speed; and
the final resistance value and the final operating speed.

4. The system of claim 1, wherein the final operating speed is determined based at least in part on a fan curve corresponding to the fan of the air handler.

5. The system of claim 1, wherein determining the updated operating speed comprises adjusting a setting of a speed controller such that the updated operating speed is equal to the new relative maximum operating speed for the fan, the new relative maximum operating speed being less than or equal to a maximum rated speed of the fan.

6. The system of claim 1, wherein instructing the fan to operate at or about the maximum relative operating speed for the fixed period of time, receiving the observed differential pressure corresponding to the intermediate resistance value of the filter medium in the transitional condition, determining the updated operating speed for the fan, and instructing the fan to operate at the updated operating speed comprises a rebalancing process, the rebalancing process repeated according to a periodic interval during a useable lifetime of the filter medium.

7. The system of claim 1, wherein the management device is further configured to:
generate an output when the intermediate resistance value approaches, meets, or exceeds the final resistance value, the output recommending that the filter medium be replaced; and
provide the output to a building management system.

8. A computer-implemented method, comprising:
instructing a fan of an air handler to operate at an initial operating speed, the initial operating speed selected such that the air handler achieves a target output volume with a filter having an initial resistance value;
instructing the fan to operate at or about a relative maximum operating speed based upon the initial operating speed for a fixed period of time;
after the fixed period of time, accessing, from a pressure sensing system, an observed differential pressure corresponding to an intermediate resistance value of the filter in a transitional condition;
determining, based on the observed differential pressure and a table of values, an updated operating speed for the fan such that the air handler achieves the target output volume, the table of values comprising:
one or more resistance values of the filter having values bounded by the initial resistance value and a final resistance value, the final resistance value representing an increased resistance in the filter attributable to particle accumulation in the filter, each resistance value of the one or more resistance values corresponding to a pressure drop attributable to the filter; and
one or more operating speeds of the fan, each associated with one or more of the resistance values and representing an operating speed of the fan at the resistance value to produce the target output volume, wherein the table of values is usable to determine operating speeds of the fan given resistance values of the filter and the target output volume; and
instructing the fan to operate at an adjusted maximum operating speed associated with the updated operating speed.

9. The computer-implemented method of claim 8, wherein the resistance values for the filter increase as the filter transitions from the initial resistance value to a dirty condition having a final resistance value.

10. The computer-implemented method of claim 8, wherein the table is based on a linear or a logarithmic interpolation between:
the initial resistance value and the initial operating speed; and
the final resistance value and a final operating speed.

11. The computer-implemented method of claim 8, wherein the observed differential pressure comprises an average differential pressure determined from two or more pressure readings collected by the pressure sensing system during the fixed period of time.

12. The computer-implemented method of claim 8, wherein determining the updated operating speed comprises adjusting a setting of a speed controller such that the updated operating speed is equal to an updated relative maximum operating speed for the fan, the updated relative maximum operating speed being less than or equal to a maximum rated speed of the fan.

13. The computer-implemented method of claim 8, further comprising determining, based at least in part on the final resistance value of the filter and the target output volume, a final operating speed for the fan such that the air handler achieves the target output volume as air flows through the filter.

14. The computer-implemented method of claim 8, further comprising:
determining, based at least in part on the intermediate resistance value, an estimated remaining life of the filter in the transitional condition; and
providing the estimated remaining life of the filter to a building management system.

15. The computer-implemented method of claim 8, wherein the pressure sensing system comprises a manometer, a first static tip, and a second static tip.

16. The computer-implemented method of claim 15, wherein the first static tip is disposed near a first side of the filter and the second static tip is disposed near a second side of the filter, the first side opposite the second side, and wherein the differential pressure is measured across the filter.

17. The computer-implemented method of claim 15, wherein the first static tip is disposed near an inlet of the air handler and the second static tip is disposed near an outlet of the air handler, and wherein the differential pressure is measured across the air handler from the first static tip to the second static tip.

18. One or more computer-readable storage devices for storing computer executable instructions that, when executed by one or more computer systems, configure the one or more computer systems to perform operations comprising:
instructing a fan of an air handler to operate at or about a first relative maximum operating speed for a first fixed period of time, the relative maximum operating speed set to achieve a target output volume through a filter medium having an initial resistance value in a clean condition, the initial resistance value corresponding to an initial pressure drop attributable to the filter medium;

accessing, after the first fixed period of time, from a pressure sensing system, a first observed differential pressure corresponding to a first intermediate resistance value of air flow by the fan through the filter medium in a first transitional condition;

determining, based at least in part on the first observed differential pressure and a set of filter loading values, a first updated operating speed for the fan such that the air handler achieves the target output volume, the set of filter loading values representing resistance values for fan flow through the filter medium that increase as the filter medium transitions from the clean condition having the initial resistance value to a dirty condition representing particulate within the filter medium, wherein the set of filter loading values is usable to determine operating speeds of the fan given resistance values of the filter medium and the target output volume; and instructing the fan to operate in accordance with an adjusted relative maximum operating speed based upon the first updated operating speed.

19. The one or more computer-readable storage devices of claim 18, wherein the computer-executable instructions configure the one or more computer systems to further perform operations comprising:

in accordance with a balancing interval, accessing, from the pressure sensing system, a second observed differential pressure corresponding to a second intermediate resistance value of the filter medium in a second transitional condition, the second observed differential pressure measured at least across the filter medium during a second fixed period of time, the second intermediate resistance value greater than the first intermediate resistance value;

determining, based at least in part on the second observed differential pressure and a subset of the set of filter loading values, a second updated operating speed for the fan such that the air handler achieves the target output volume; and instructing the fan to operate in accordance with the second updated operating speed.

20. The one or more computer-readable storage devices of claim 18, wherein the computer-executable instructions configure the one or more computer systems to further perform operations comprising:

determining, based at least in part on the first intermediate resistance value, an estimated remaining life of the filter medium in the first transitional condition; and providing the estimated remaining life of the filter medium to a building management system.

* * * * *